United States Patent [19]

Hess et al.

[11] 4,211,122

[45] Jul. 8, 1980

[54] DRIVE ARRANGEMENT FOR AN AUTOMOTIVE WINDOW OPERATING MECHANISM

[75] Inventors: Peter Hess, Coburg; Hans Rampel, Eicha, both of Fed. Rep. of Germany

[73] Assignee: Metallwerk Max Brose GmbH & Co., Coburg, Fed. Rep. of Germany

[21] Appl. No.: 871,021

[22] Filed: Jan. 20, 1978

[30] Foreign Application Priority Data

Feb. 10, 1977 [DE] Fed. Rep. of Germany ....... 2705627

[51] Int. Cl.2 .......................... E05F 11/48; F16C 1/10

[52] U.S. Cl. .................................. 74/89.2; 74/501 R; 74/625; 49/352; 403/4

[58] Field of Search .......................... 49/349, 352, 374; 74/29, 33, 88.16, 89.17, 89.18, 89.2, 89.21, 89.22, 422, 501 R, 625; 248/514, 535, 70, 74 R; 403/4, 174, 178

[56] References Cited

U.S. PATENT DOCUMENTS

| | | | |
|---|---|---|---|
| 2,026,459 | 12/1935 | Caretta | 74/422 X |
| 2,859,630 | 11/1958 | Hatch | 74/422 X |
| 2,890,595 | 6/1959 | Loeffler | 74/501 X |
| 2,947,194 | 8/1960 | Shimanckas | 74/501 R |
| 3,280,509 | 10/1966 | Werner | 49/352 |
| 3,791,071 | 2/1974 | Niklaus | 49/349 X |
| 3,828,624 | 8/1974 | Wiegand | 74/501 R |

FOREIGN PATENT DOCUMENTS

| | | | |
|---|---|---|---|
| 1259730 | 1/1968 | Fed. Rep. of Germany | 49/352 |
| 633720 | 12/1949 | United Kingdom | 248/514 |
| 787765 | 12/1957 | United Kingdom | 74/422 |

*Primary Examiner*—Lawrence J. Staab

*Attorney, Agent, or Firm*—Toren, McGeady and Stanger

[57] ABSTRACT

The window in the door of an automotive vehicle is raised and lowered by means of an externally threaded, longitudinally moving cable. The drive arrangement for the cable includes a shell having first and second shell portions of which at least one is formed with an aperture. A pinion is rotatably secured between the shell portions and journaled in the aperture of apertures. A first group of fastening devices fastens the first shell portion to the second shell portion in a predetermined position, but may also fasten the shell portions to one another in each of a plurality of other positions angularly offset about the axis of pinion rotation from the predetermined position. The shell portions define therebetween respective passages through the shell in the several positions of the first shell portion, the passages being approximately tangential relative to the pinion and angularly offset from each other about the axis of the pinion. Each passage is associated with one of the positions of the first shell portion, and the externally threaded cable is movably received in the passage associated with the predetermined position of the first shell portion, but dimensioned for longitudinal movement in each of the other passages. A second group of fastening devices permits the second shell portion to be fastened to the vehicle door.

30 Claims, 28 Drawing Figures

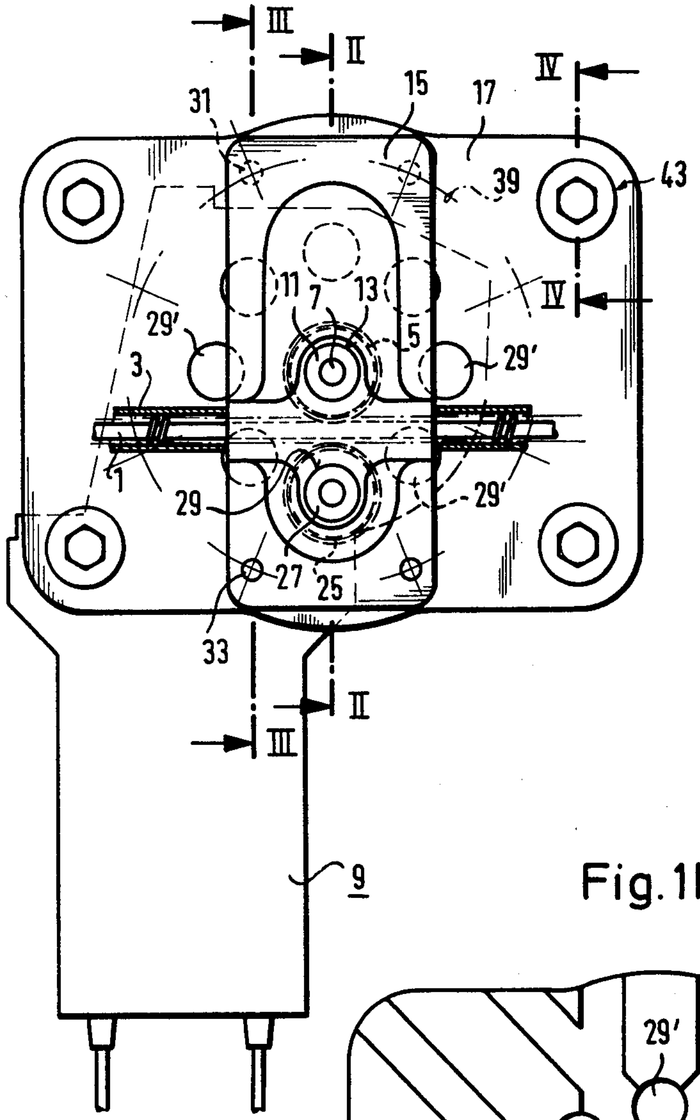
Fig.1a
Fig.1b
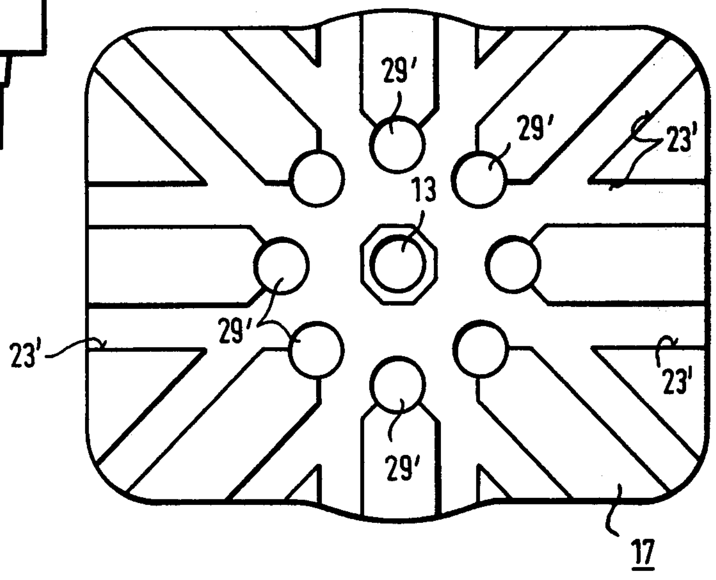

DRIVE ARRANGEMENT FOR AN AUTOMOTIVE WINDOW OPERATING MECHANISM

This invention relates to cable-operated window lifting mechanisms suitable for the windows in doors of automotive vehicles, and particularly to a drive arrangement for a sliding window having a drive mechanism for a drive pinion which engages a threaded cable connected to the sliding window. The drive pinion is supported between two shell members into which there are molded oppositely located duct halves for receiving the threaded cable and which are connected by fastening members surrounding the axis of the drive pinion.

A cable-operated window lifting mechanism is known from German Auslegeschrift No. 1,259,730. The two shell members are stamped from sheet metal and they are riveted together. A guide tube extends past the drive pinion in a straight duct which is formed by grooves having semi-circular cross-sections. A design of this type has a disadvantage that the guide tube and drive arrangement are fixedly assigned to each other since the design essentially predetermines the mounting position of the drive arrangement. Since the mounting position cannot be selected freely in many types of applications, and since sharp bends of the threaded cable, which is resilient only to a limited extent, must be avoided, it can be difficult to effect mounting of an arrangement such as that known in the prior art. This is particularly true when the drive arrangement is to be actuated by a geared electric motor, which, in turn, requires a certain degree of space.

The present invention is primarily directed toward the task of providing a cable-operated window mechanism of the type described above, whereby fastening of the shell portions which serve as a base plate at the vehicle door or the like is essentially independent from the angular direction in which the threaded cable is directed toward the drive pinions.

The present invention provides a solution to the tasks recited above by a cable-operated window lifting mechanism characterized in that one of the shell members has molded therein several duct halves extending around the axis of the drive pinion with an equivalent spacing from the axis of the drive pinion and that fastening members are arranged in such a manner that each of the duct halves may be optionally brought to coincide with the duct half in the other of the shell members.

In this manner, by rotating the shell members relative to each other, it is possible to change the position at which the threaded cable runs through the driving mechanism. The positions of the shell members relative to each other are selected in accordance with optimum mounting positions of the drive arrangement.

In such a cable-operated window lifting mechanism, if a pressure member is arranged between the two shell members in a known manner on that side of the duct halves which is located opposite the drive pinion, the lifting mechanism will be preferably characterized in that on one of the shell members there will be arranged several mounting supports for the pressure member, the mounting supports being assigned to the several duct halves.

Accordingly, the pressure member may be adjusted to the different angular positions of the two shell members relative to each other.

The pressure member may be constructed as a pin, or the like, which projects from one shell member toward the other and which is supported in a recess of the latter. However, a wheel is preferred because it develops less noise. Such a wheel may be supported, for example, on one of the aforementioned pins.

In particular embodiments, with a drive pin or pressure wheel supported on both sides on pin shafts, for each position of the shell members relative to each other, the fastening members should be constructed as mutually complementary mating elements. In the simplest structural arrangement, the mating elements may be composed of pins which project from one of the shell members and engage within openings in the other of the shell members. Riveted connections are possible when the pins extend through the other shell member.

In a further embodiment of the invention, mating elements of one of the shell members are constructed as ribs and/or grooves and those of the other shell member are constructed as ribs. In an embodiment of this type, the shell members may be rotated relative to each other in particularly small stages by means of ribs which engage between the ribs or in the grooves of the other shell member.

The accuracy with which the shell members can be manufactured in the region of the ducts or at the bearings of the drive pinion and the pressure wheel is of essential importance for the operating behavior of the drive arrangement, particularly if there is to be insured easy motion and low noise levels. Cast shell members are most suitable and zinc pressure castings are preferred. In this manner, it is not only possible to accurately produce satisfactory bearings, but the bearings and particularly also the duct through which the threaded cable extends may be self-lubricating to a particular degree without the provision of additional cast-in sliding members. Moreover, the cross-section of the effective material may be selected without problems in accordance with the load and it will be possible to essentially avoid operating noises particularly when zinc is utilized as the material.

Other features, additional objects, and many of the attendant advantages of this invention will readily be appreciated as the same becomes better understood by reference to the following detailed description of preferred embodiments when considered in connection with the appended drawing in which:

FIG. 1a shows a drive arrangement of the invention in side elevation;

FIG. 1b illustrates portions of elements of the arrangement of FIG. 1a on a larger scale;

Figure 2:
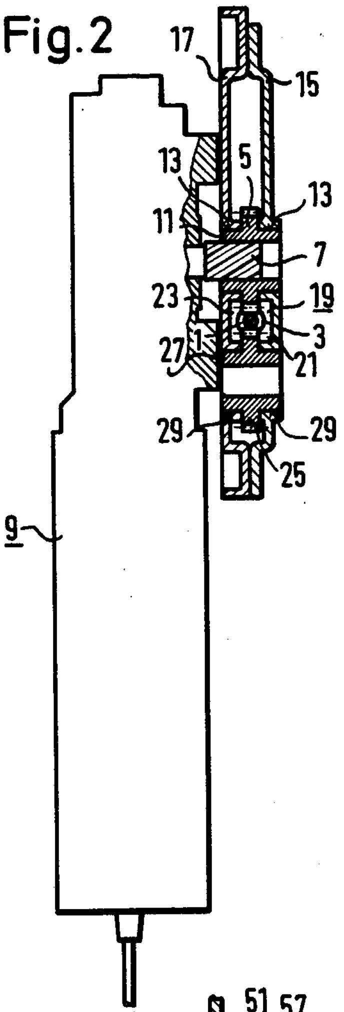
Figure 3:
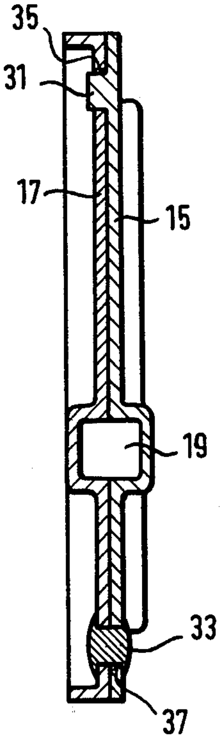
Figure 4:
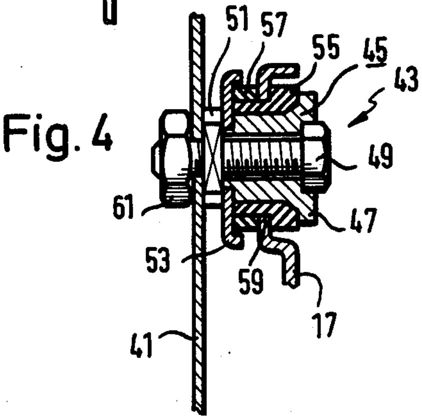
Figure 5:
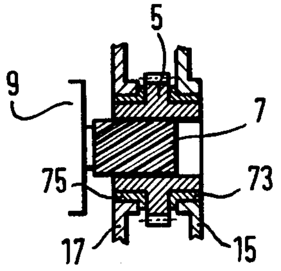
Figure 6:
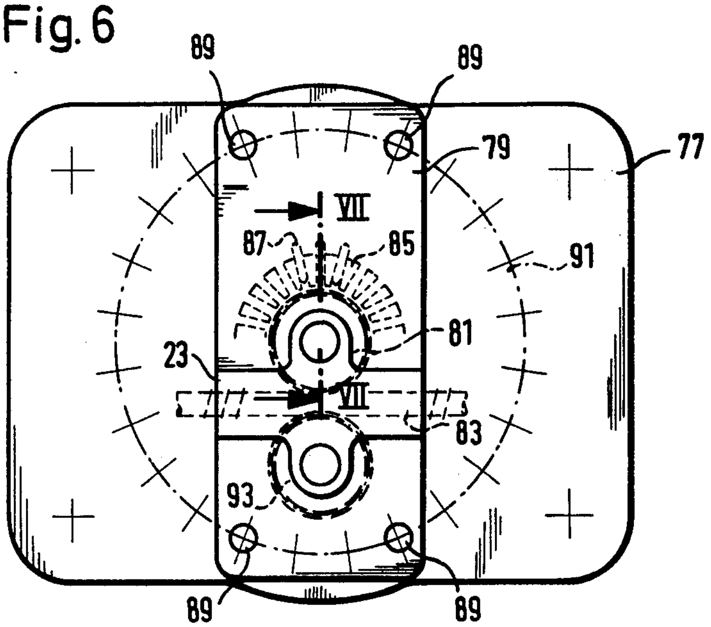
Figure 7:
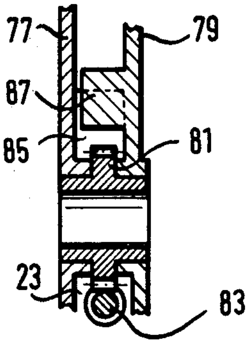
Figure 8:
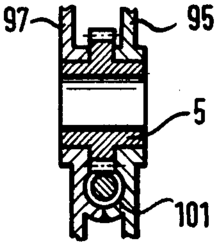
Figure 13:
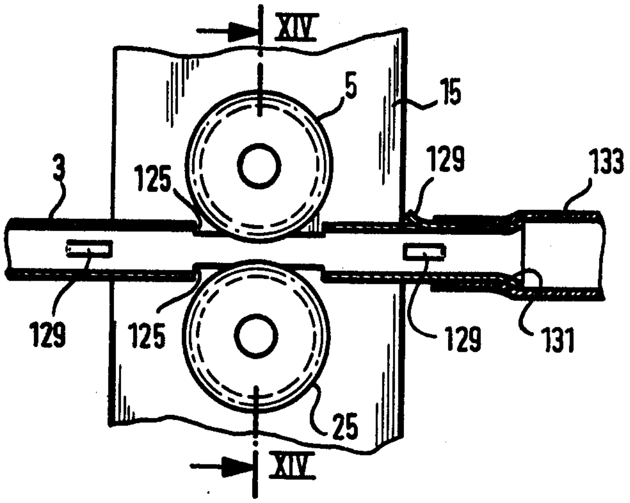
Figure 14:
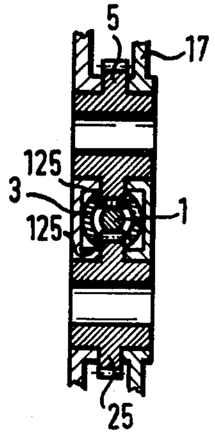
Figure 15:
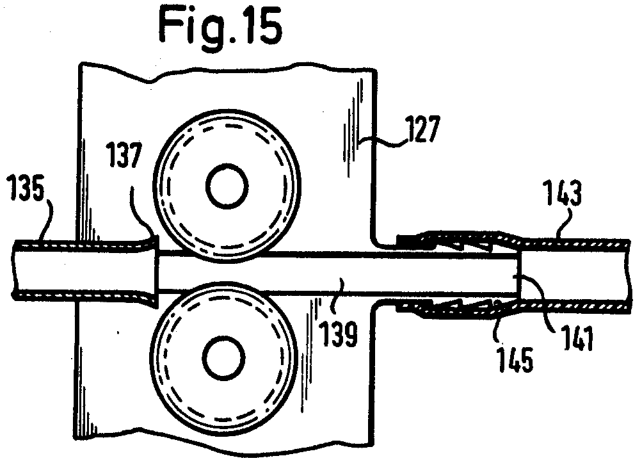
Figure 16:
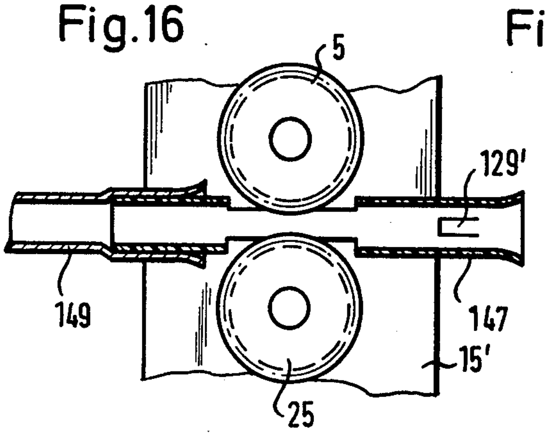
Figure 17:
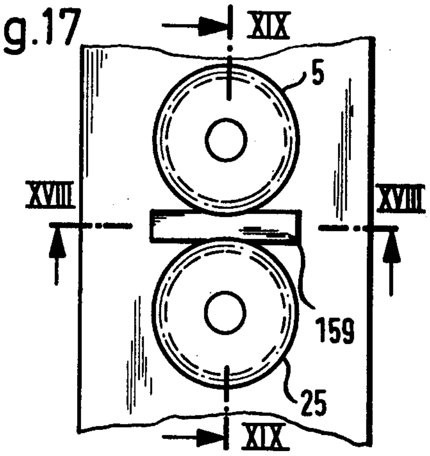
Figure 18:
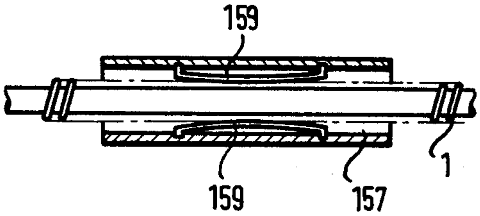
Figure 19:
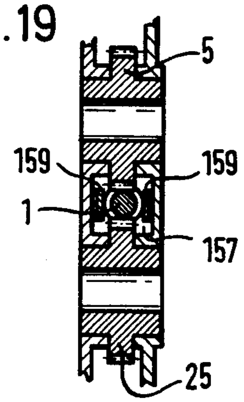
Figure 20:
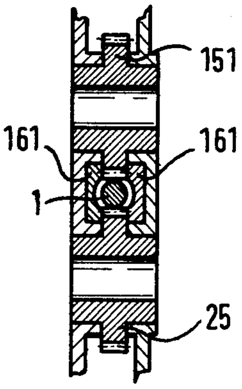
Figure 21:
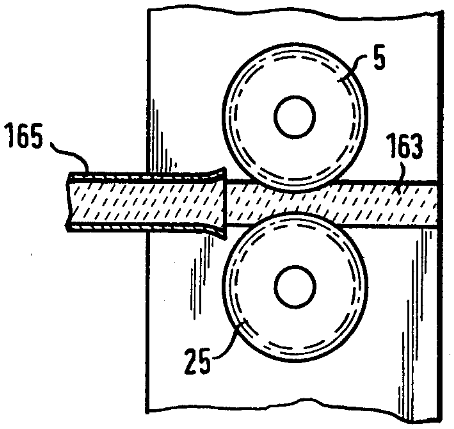
Figure 22:
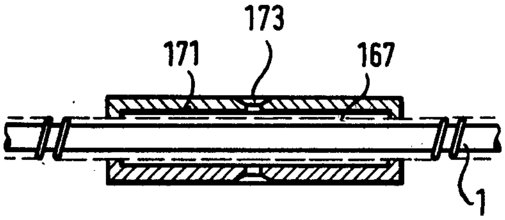
Figure 23:
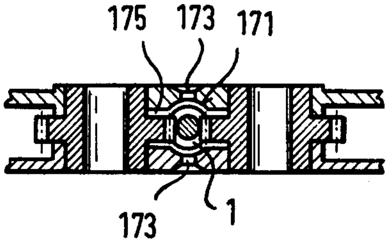
Figure 24:
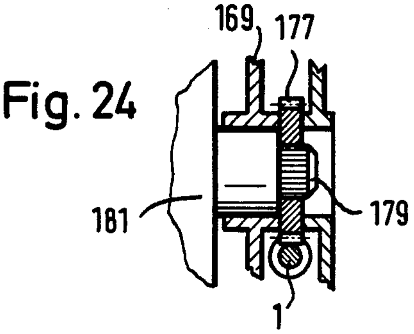
Figure 25:
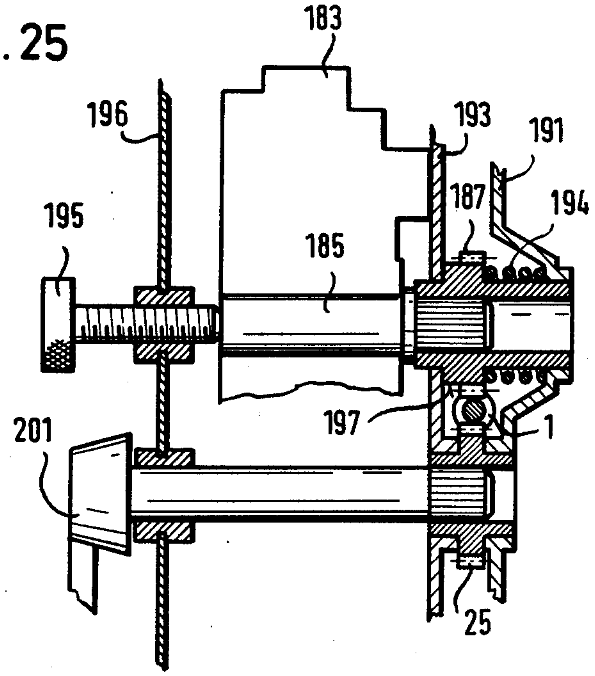
Figure 26:
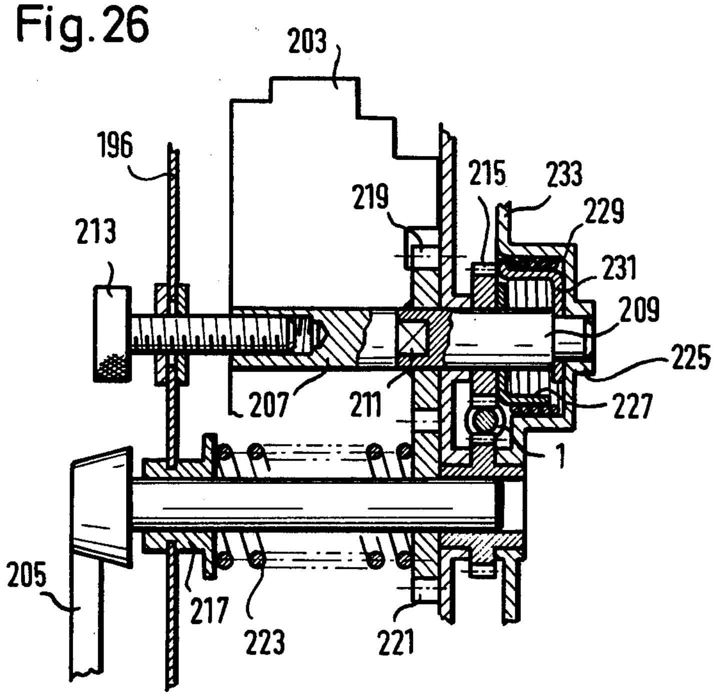
Figure 27:
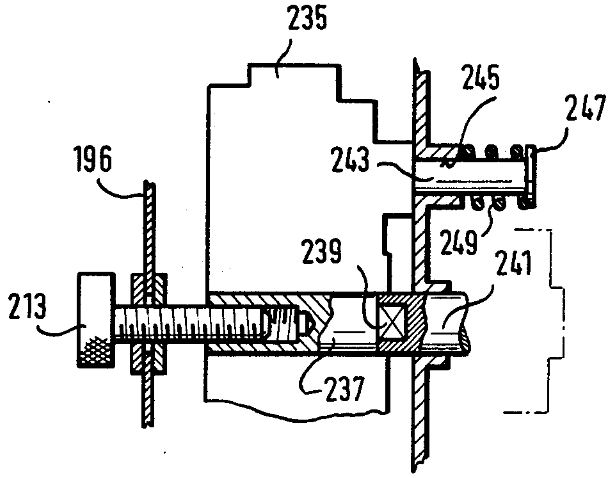

FIGS. 2, 3, and 4 are sectional views of the apparatus of FIG. 1a taken on the lines II—II, III—III, and IV—IV respectively, and partly on a larger scale;

FIG. 5 shows a modified detail of the same apparatus in an enlarged view corresponding to FIG. 2;

FIG. 6 illustrates a modification of the apparatus of FIG. 1a in side elevation and partly by conventional symbols;

FIG. 7 is a fragmentary sectional view of the apparatus of FIG. 7 taken on the line VII—VII;

FIGS. 7 to 12 show further modifications of the drive arrangement of FIG. 2 in views analogous to that of FIG. 7;

FIG. 13 illustrates elements of the drive arrangement of FIG. 1a in side elevation and partly in section;

FIG. 14 illustrates the device of FIG. 13 in partial section on line XIV—XIV;

FIG. 15, FIG. 16, and FIG. 17 are views corresponding to FIG. 13 of additional drive arrangements of the invention;

FIGS. 18 and 19 show the device of FIG. 17 in respective fragmentary sections on the lines XVIII—XVIII and XIX—XIX;

FIG. 20 illustrates a modification of the device of FIG. 19 in a corresponding view;

FIG. 21 is a fragmentary side-elevational view of a further drive arrangement of the invention;

FIG. 22 shows elements of yet another drive arrangement of the invention in plan section;

FIG. 23 illustrates a device similar to that of FIG. 22 in side-elevational section;

FIG. 24 is a fragmentary, side-elevational view of yet another drive arrangement of the invention;

FIGS. 25, 26, and 27 illustrate respective modifications of the drive arrangement of FIG. 2 in fragmentary, corresponding views.

Referring now to the drawing in detail, and initially to FIGS. 1*a* to 3, there is shown a drive arrangement for a window operating mechanism of the type disclosed in the aforementioned U.S. patent modified for use of an externally threaded cable 1 in a manner similar to the German application referred to above. Sections of a guide tube 3 lead the cable 1 past a drive pinion 5 which meshes with the cable as in a rack-and-pinion drive. The pinion 5 is fixedly fastened to the output shaft 7 of an electric gear motor 9 by means of its integral, tubular hub portion 11 which is journaled in central apertures 13 of a metal shell consisting of two zinc diecastings 15, 17. The larger shell portion 17 constitutes a mounting plate by means of which the drive arrangement is fastened in a hollow motorcar door, as will presently be described, and the shell portion 15 provides a cover for the shell cavity.

Respective integral walls 21, 23 of the shell portions 15, 17 bound grooves in the shell portions jointly constituting a passage 19 in which the cable 1 is moved longitudinally through the shell by the pinion 5. The cable is kept engaged by the teeth of the drive pinion 5 by means of a backing pinion 25, an idler whose tubular hub 27 is journaled in respective openings 29 of the shell portions 15, 17.

The cover 15 may be fastened to the mounting plate 17 in seven positions in addition to the illustrated position. The several positions of the cover 15 are offset 45° from each other relative to the axis of rotation of the drive pinion 5. Two locating pins 31 projecting from the cover 15 may engage any two adjacent openings 35 in the mounting plate 17 which are spaced 45° apart along a circular reference line 39 centered in the axis of the pinion 5. Additionally, two rivets 33 are secured in two openings 35 of the mounting plate 17 and in mating openings 37 of the cover 15.

As is shown in FIG. 2, additional walls 23' of the mounting plate 17 bound angularly offset grooves which may be aligned with the groove between the walls 21 of the cover 15 in the several angular positions of the latter to provide straight passages approximately tangential relative to the pinions 5, 25. The idler pinion 25 needs to be relocated from the bearing opening 29 in the mounting plate 17 to one of seven other openings 29' if the cover is shifted angularly on the mounting plate.

As is shown in FIG. 4 in more detail, the four corners of the rectangular mounting plate 17 are fastened to a sheet metal panel 41 of a vehicle door, not otherwise illustrated, by four resilient fastening assemblies 43 in a position selected to accommodate the shell of the drive arrangement and the attached electric motor 9 in the available door space, the angular position of the cover 15 on the installed mounting plate being selected to suit the need for minimizing sharp angular bends in the moving cable 1.

Each mounting assembly 43 includes a metal bushing 45 provided with a flange 47 at one axial end. The head of a bolt 49 abuts against the flange 47, and a nut 51 on the shank of the bolt 49 fixedly fastens a dished washer 53 to the other axial end of the bushing 45. A split rubber grommet consisting of a flanged sleeve 55 and a ring 57 defines a groove in which the rim 59 about an opening in the mounting plate 17 is secured. The free end of the bolt 49 passes through an opening in the panel 41 and is clamped fast by a nut 61. The mounting assemblies prevent metal-to-metal contact between the shell of the drive arrangement and the panel 41 and thereby avoid a source of noise during operation of the non-illustrated window.

If the pinion 5 transmits relatively heavy pressure to the shell 15, 17, wear of the latter may be avoided by interposing bronze bearing bushings 73, 75 between the hub portion of the pinion 5 and the shell portions 15, 17 in the manner shown in FIG. 5.

In the embodiment of the invention illustrated in FIGS. 6 and 7, which is closely similar to or identical with the device described with reference to FIGS. 1 to 4 as far as not explicitly set forth otherwise, a cover 79 may be fastened on a mounting plate 77 in several positions angularly offset about the axis of rotation of a drive pinion 81 so that the path of a threaded cable 83 driven by the pinion be oriented suitably relative to the mounting plate. Instead of the locating pins 31 described above, the two shell portions 77, 79 are provided with sets of radially elongated ribs 85, 87 equiangularly distributed about the axis of rotation of the pinion 81. The ribs on each shell portion are simultaneously engaged in grooves between ribs on the other shell portion in all angular positions of the cover 79. The cover may be fastened to the mounting plate 77 in each of the many angular positions defined by the circumferentially narrow ribs and grooves by means of four rivets 89 received in corresponding openings of the cover 79 and openings, not specifically illustrated, which are distributed along a circular line of reference 91 about the axis of the pinion 81. Multiple bearing openings for a backing pinion 93 are provided in the mounting plate 77 in the manner obvious from FIG. 1*b*, but not specifically shown in FIG. 6.

Figure 9:
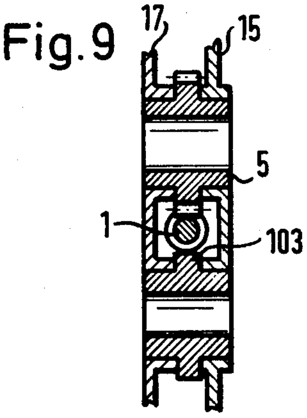
Figure 10:
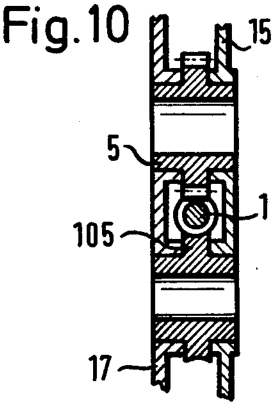

A threaded cable may be secured in its engagement with a drive pinion by backing elements other than an idler pinion as is shown in FIGS. 8 to 12. Integral lugs 101 extend from the shell portions 95, 97 toward each other in a closed arc to prevent movement of the cable radially away from the drive pinion 5. A backing wheel 103 shown in FIG. 9 is provided with a continuous, cylindrical rib pressing against the threads of the cable 1. A similar wheel 105 illustrated in FIG. 10 is provided with a toroidally arcuate circumferential face on a similar rib for line contact with the threads of the cable 1, whereas the rib shown in FIG. 9 makes only point contact.

Figure 11:
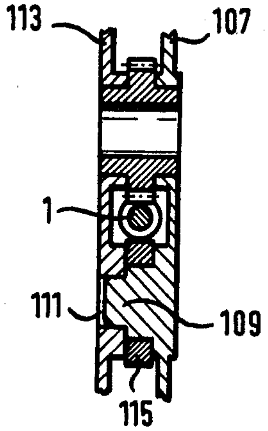
Figure 12:
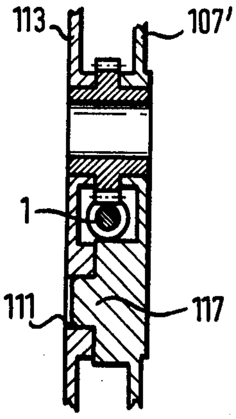

An integral, axial projection 109 on the cover 107 of the shell partly illustrated in FIG. 11 is of stepped, cylindrical shape. Its reduced, free end portion may be received in each of several openings 111 of the associated mounting plate 113 and thereby hold the cover in each of its several angular positions on the mounting plate. An idler ring 115 rotatably supported by the axially central portion of the projection 109 engages the cable 1. In the otherwise similar drive arrangement of FIG. 12, the idler ring is dispensed with, and the central portion of the modified projection 117 on the cover 107' is radially enlarged to back the cable 1 in sliding contact.

FIGS. 13 and 14 show in greater detail how the guide tube 3 leads the cable 1 to the pinions 5, 25. Respective longitudinal sections of the straight guide tube 3 are received in the shell 15, 17 and project in opposite directions from the shell. The guide tube is of generally cylindrical shape, but its intermediate portion within the shell is provided with slots 125 through which the pinions 5, 25 extend into engagement with the cable 1, the cable being omitted from FIG. 13 for the sake of clarity. Portions 129 of the guide tube wall are bent outward to provide fastening lugs engaging edge faces of the cover 15 and thereby longitudinally securing the guide tube 3.

Where the cable 1 does not travel in a straight line, it is protected by a flexible plastic hose 133, as is known in itself. The hose is slipped over a flaring, longitudinally open orifice 131 of the guide tube 3 so as to avoid undue friction between the cable and the rim about the orifice of the tube 3 and the noise which would otherwise result from the movement of the cable out of the wider hose 133 into the narrower tube 3.

The passage through the shell of the drive arrangement partly illustrated in FIG. 15 includes a groove 139 of generally semi-circular cross section in the cover 127. A guide tube section outside the shell proper is constituted in part by one half of the nipple 141 integral with the cover 127 and provided with circularly arcuate barbs 145 on its outer surface. The barbs secure the elastically expanded end of a plastic hose 143 whose internal diameter is approximately equal to that of the groove 139 in the relaxed condition of the hose so that entry of the non-illustrated cable into the nipple 141 does not cause cable wear nor noise. The end portion of the groove 139 remote from the nipple 141 is shaped for conformingly receiving a rigid guide tube 135 whose orifice 137 in the shell flares conically toward the nipple 141 for smooth entry of the threaded cable.

The guide tube arrangement illustrated in FIG. 16 combines features described with reference to FIGS. 13 to 15. A guide tube 147 of nylon or like self-lubricating plastic is slotted for access of the pinions 5, 25 to the non-illustrated cable. The tube 147 lines a groove in the cover 15' and is longitudinally secured in the groove by lugs 129'. The flaring end of a metallic guide tube 149 extends partly into the groove and is conformingly secured therein. It receives one end of the plastic tube 147.

Guide tube sections within the shell of a drive arrangement of the invention may be dispensed with in the manner shown in FIGS. 17 to 19 if leaf springs 159 are arranged in the passage 157 of the shell in the area between the pinions 5, 25 to confine the threaded cable 1. The springs 159 are elongated in the direction of cable movement, and their offset ends are anchored in the respective shell portions. Guidance without significant friction may also be achieved as is shown in FIG. 20 by means of liners 161 of self-lubricating plastic or of spring temper steel which conformingly envelop the cable 1 in the area between the pinions 5, 25.

Alternatively, the cable, not itself shown in FIG. 21 may be protected by a film of liquid lubricant retained in a guide groove 163 and an associated, outwardly extending guide tube 165 by slightly roughened surfaces. Recesses between the almost microscopic projections of the passage provided by the groove 163 and the tube 165 retain a supply of lubricant.

As indicated in FIG. 22, lubricant may be supplied continuously or from time to time to the cable 1 traveling through the shell of a drive arrangement of the invention by way of oiling holes 173 in the shell portions leading into a passage 167 whose wall is provided with narrow, longitudinal grooves 171. As is shown in FIG. 23, illustrating a similar device, the several grooves 171 may be connected by transverse groove 175 which also supply lubricant to the bearings for the pinions 5, 25.

FIG. 24 shows an electric gear motor 181 whose output shaft 179 is journaled in an aperture of a mounting plate 169 not otherwise significantly different from the mounting plate 17. A drive pinion 177 for the cable 1 is fixedly mounted on the reduced, knurled end of the shaft 179.

An auxiliary manual drive for a window operating mechanism normally drive by an electric motor is desirable at least for emergency use if the electric drive malfunctions, and may be provided in drive arrangements of the invention as is shown in FIGS. 25 to 27.

The housing 183 of the gear motor illustrated in FIG. 25 carries an output shaft 185 which may be shifted axially in the housing 183. The integral, tubular hub of a drive pinion 187 for a cable 1 is fixedly fastened on one knurled end of the shaft 185. The pinion 187 is journaled in respective apertures of a mounting plate 193 and a cover 191, closely similar to the shell portions 15, 17 as far as not shown and described. A helical compression spring 194 abuts axially against the toothed rim of the pinion 187 and the cover 191 to hold the pinion in the illustrated axial position in which it abuts against the mounting plate and engages the cable 1.

The mounting plate 193 is fixedly fastened to a door panel 196 as described with reference to FIG. 4, and a spindle 195 coaxial with the shaft 185 is threadedly mounted in the panel 196. The end of its shank abuts against the shaft 185 and shifts the shaft and the pinion 187 out of the illustrated position of engagement with the cable 1 against the restraint of the spring 194 when the knurled head of the spindle 195 is turned. Friction of the non-illustrated gear transmission in the housing 183 thereafter cannot interfere with movement of the cable 1.

The backing pinion 25 normally prevents disengagement of the cable 1 from the drive pinion 187 may be secured against rotation on the shaft of a manually operated crank 201 when the crank is inserted in the door panel 196. When the cable 1 is released from the drive pinion 187, it may be shifted longitudinally by means of the pinion 25 turned by the crank 201. A smoothly cylindrical surface 197 of the disengaged pinion 187 keeps the cable 1 engaged with the pinion 25 when the latter drives the cable.

Another drive arrangement of the invention which may be operated alternatively by an electric motor 203 and a manual crank 205 is illustrated in FIG. 26. The output shaft of the gear motor 203 has an axially movable section 207 and a section 209 which is axially fixed in the shell of the drive arrangement. The two sections are coupled in the illustrated condition by mating engagement of an end portion 211 of the section 207, which is of square cross section, in an axially open recess of the section 209. A spindle 213 is axially secured, but rotatable in a door panel 196 and threadedly engages in an axial bore of the shaft section 207, thus permitting the end portion 211 to be withdrawn from driving engagement with the shaft section 209 by turning the knurled head of the spindle 213.

A spur gear 221 on the crank 205 is normally disengaged from a spur gear 219 on the shaft section 209 by a helical tension spring 223 coiled about the crank 205 and attached to the gear 221 and a tubular plug 217 rotatable in the panel 196. The gears 219, 221 are engaged by axial pressure applied to the handle of the crank 205. The drive pinion 215 for the cable 1 is rotatably supported on the shaft section 209 and carries an eccentric, axial abutment bar 227. A similar bar 231 is fixedly mounted on the shaft section 209. A helical spring 229 coaxial with the shaft 209 and a cup-shaped portion 225 of the cover 233 is normally held under radial compressive stress by the cover portion 225 which constitutes a brake drum. The two ends of the spring 229, not themselves visible in FIG. 26, are offset at right angles into the path of the bars 227, 231. When the shaft section 209 is released simultaneously from the motor 203 and the crank 205, the brake arrangement including the spring 229 holds the non-illustrated window in position by preventing rotation of the pinion 215. When the shaft section 209 is driven, the spring 229 is tightened, pulled away from the brake drum 225 and does not interfere with movement of the cable 1.

In the modified drive arrangement shown in FIG. 27, the gear motor in the housing 235 has an output shaft whose sections 237, 241 are coupled by a square end portion 239 on the shaft section 237 in the illustrated condition of the apparatus. The sections 237 and 241 are respectively fixed in an axial direction in the housing 235 and in the shell of the drive arrangement, but the motor is mounted on the shell by means of several parallel supporting rods 243 longitudinally slidable in openings 245 of the shell. Helical compression springs 249 interposed between a collar 247 on each rod 243 and the inner shell wall normally hold the motor in the illustrated position, only one rod 243 and associated elements being shown. A spindle 213 is secured axially in a door panel 196 and threadedly engages an axial bore in the shaft section 237. When the spindle 213 is turned, the motor is moved toward the left, as viewed in FIG. 27, and the square end 239 is withdrawn from the shaft section 241, thereby permitting the non-illustrated threaded cable to be moved manually as shown in FIG. 25 or FIG. 26 by devices not again illustrated in FIG. 27.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A window operating mechanism particularly for motor vehicles comprising:
- a threaded cable adapted to have a window in driven engagement therewith;
- drive means including a drive pinion in driving engagement with said cable;
- shell means including first and second shell members defining therebetween duct means through which said threaded cable passes;
- fastening means connecting said shell members together, said fastening means being arranged to surround the axis of said drive pinion;
- said duct means being defined by complementary duct halves, each formed respectively in opposite ones of said first and second shell members;
- with at least one of said shell members being provided with a plurality of said duct halves arranged with a generally equivalent spacing relative to the axis of said drive pinion;
- said fastening members being arranged in such a manner that each of said duct halves may be selectively brought into coincident relationship with a complementary duct half in the opposite shell member.

2. A window operating mechanism according to claim 1, further comprising a pressure member arranged between said shell members on a side of said cable opposite said drive pinion, and a plurality of mounting supports for said pressure member provided in said first shell member, said mounting supports being assigned to various ones of said duct halves.

3. A window operating mechanism according to claim 1, wherein
- fastening members are constructed from mutually complementary mating elements.

4. A window operating mechanism according to claim 3, wherein
- said mating elements comprise mating elements consisting of one of ribs and grooves formed in one of said shell members and mating elements consisting of ribs formed in the other of said shell members.

5. A window operating mechanism according to claim 1, wherein
- said shell members consist of metal castings.

6. A window operating mechanism according to claim 5, wherein
- said metal castings consist of zinc pressure castings.

7. A window operating mechanism particularly for a motor vehicle comprising:
- a threaded cable adapted to have a window in driven engagement therewith;
- drive means including a drive pinion in driving engagement with said cable;
- a guide tube having said cable slidingly received therein;
- shell means including first and second shell members defining therebetween duct means through which said threaded cable passes;
- fastening means including fasteners for connecting at least one of said shell members to a support structure and fastening members for connecting said shell members together;
- a pressure member located relative to said duct means on a side of said cable opposite the side on which said drive pinion is located;
- said pressure member being supported between said shell members, with said drive pinion and said pressure member being provided on opposite sides thereof with hub portions formed integrally with said pressure member and said drive pinion, and bearing openings formed in said shell means for supporting said hub portions of said pressure member and said drive pinion therein, with one of said shell members having formed therein several bearing openings around the axis of rotation of said drive pinion.

8. A window operating mechanism according to claim 7, wherein said bearing openings for supporting the hub portions of said drive pinion contain a bearing bushing.

9. A window operating mechanism according to claim 7, wherein said pressure member is formed with a surface in engagement with said cable, said engagement surface being formed of a shape conforming to the cross-sectional configuration of said cable.

10. A window operating mechanism according to claim 7, wherein said pressure member comprises a pin formed as part of one of said shell members and engaging within an opening of the other of said shell members.

11. A window operating mechanism according to claim 10, further including a sliding member mounted on said pin having said threaded cable in rolling engagement therewith.

12. A window operating mechanism according to claim 7, wherein said drive means include an electrical driving motor having an output shaft in driving engagement with said drive pinion, said drive pinion being formed with a hollow hub portion wherein said output shaft of said electric motor is received.

13. A window operating mechanism according to claim 12, further comprising crank means including a crank shaft, said pressure member being constructed as a pressure wheel with a hollow hub portion within which said crank shaft is received.

14. A window operating mechanism according to claim 7, wherein said guide tube extends through said duct means and includes a region having an opening formed therein through which at least one of said drive pinion and pressure member may extend.

15. A window operating mechanism according to claim 7, wherein said guide tube includes lugs which are bent outwardly thereof, said lugs including free ends which rest against edges of said shell members in order to axially lock said guide tube in place.

16. A window operating mechanism according to claim 7, wherein said guide tube terminates short of the point of engagement between said drive pinion and said cable, and wherein said terminal portion of said guide tube is widened in a funnel-like configuration.

17. A window operating mechanism according to claim 16, wherein said guide tube includes a further terminal end, and wherein a protective hose for said threaded cable is mounted in sliding engagement over said further terminal end.

18. A window operating mechanism according to claim 17, wherein said further terminal end of said guide tube is located on a side of said guide tube extending away from the point of contact between said drive pinion and said cable.

19. A window operating mechanism according to claim 7, wherein said duct means are formed to include a hollow nipple defined by portions of said shell members which defines a portion of said duct means extending away from the point of contact between said drive pinion and said cable, said hollow nipple being defined by opposite half portions of said shell members.

20. A window operating mechanism according to claim 7, further comprising a glide sleeve wherein said threaded cable is guided within said duct, said glide sleeve having openings through which at least one of said drive pinion and said pressure member may extend, said guide tube being mounted onto said glide sleeve.

21. A window operating mechanism according to claim 7, wherein gliding pieces are arranged in said duct means on both sides of said cable between said drive pinion and said pressure member, said gliding pieces operating to guide said threaded cable transversely relative to the plane of said drive pinion.

22. A window operating mechanism according to claim 7, including wall surfaces of said duct means which are exposed toward said threaded cable, said exposed wall surfaces being provided with lubricant means.

23. A window operating mechanism according to claim 22, wherein said lubricant means comprise lubricant cavities.

24. A window operating mechanism according to claim 22, wherein said lubricant means comprise a covering having plastic fibers.

25. A window operating mechanism according to claim 7, wherein said duct means are formed with lubricating openings accessible to permit lubricant to be introduced into said duct means.

26. A window operating mechanism according to claim 7, wherein said drive pinion is nonrotatably seated on an axially movable power output shaft of an electric geared motor, said pinion being adapted to be slidable from engagement with said threaded cable together with said output shaft, said threaded cable meshing with a pinion which is mounted opposite said output shaft and which is provided with an inserting coupling for a hand crank.

27. A window operating mechanism according to claim 26, wherein said drive pinion has an axially projecting circumferential shoulder which serves as a pressure member of an additional pinion when said geared motor is uncoupled.

28. A window operating mechanism according to claim 7, wherein said drive pinion is seated on a shaft which is supported in one of said shell members and which is coupled through a plug coupling to an axially movable output shaft of an electric motor, said mechanism further comprising a gear nonrotatably mounted on said shaft, said gear being arranged to mesh with another gear which is nonrotatably mounted on a manual crank shaft, said manual crank shaft being inserted into said additional gear and being axially movable with said additional gear.

29. A window operating mechanism according to claim 28, wherein said drive pinion is rotatably mounted on a shaft and carries a claw which is connected to another claw which is held on said shaft by means of an outwardly directed helical spring which is surrounded by a brake drum.

30. A window operating mechanism according to claims 28 or 29, wherein said output shaft of said electric motor is held axially rigid on said motor, and wherein said motor is movably mounted relative to said shell members on guide rods to enable movement of said motor output shaft relative to said shell members in the axial direction of said output shaft.

* * * * *